US011362565B2

(12) United States Patent
Pan et al.

(10) Patent No.: US 11,362,565 B2
(45) Date of Patent: Jun. 14, 2022

(54) ELECTROMAGNETIC AUTOMATIC BALANCING DEVICE BASED ON RADIAL EXCITATION (71) Applicant: BEIJING UNIVERSITY OF CHEMICAL TECHNOLOGY, Beijing (CN)

(72) Inventors: Xin Pan, Beijing (CN); Hai-Qi Wu, Beijing (CN); Zhi-Nong Jiang, Beijing (CN); Jin-Ji Gao, Beijing (CN)

(73) Assignee: BEIJING UNIVERSITY OF CHEMICAL TECHNOLOGY, Beijing (CN)

( * ) Notice: Subject to any disclaimer, the term of this patent is extended or adjusted under 35 U.S.C. 154(b) by 0 days.

(21) Appl. No.: 17/561,884

(22) Filed: Dec. 24, 2021

(65) Prior Publication Data

US 2022/0140692 A1    May 5, 2022

Related U.S. Application Data (63) Continuation of application No. PCT/CN2020/123514, filed on Oct. 26, 2020.

(30) Foreign Application Priority Data

Oct. 30, 2019    (CN) .......................... 201911050276.X (51) Int. Cl.
H02K 7/04 (2006.01)
H02K 5/04 (2006.01)

(52) U.S. Cl.
CPC ................. *H02K 7/04* (2013.01); *H02K 5/04* (2013.01)

(58) Field of Classification Search
CPC .................................. H02K 7/04; H02K 5/04
(Continued)

(56) References Cited

U.S. PATENT DOCUMENTS 5,955,807 A * 9/1999 Kajiura ................ H02K 21/044
310/156.69
8,242,661 B2 * 8/2012 Asano .................... H02K 1/2793
310/268

(Continued)

FOREIGN PATENT DOCUMENTS

CN    204290596 U    4/2015
CN    105680616 A    6/2016
(Continued)

OTHER PUBLICATIONS

International Search Report of PCT/CN2020/123514.

*Primary Examiner* — John K Kim
(74) *Attorney, Agent, or Firm* — J.C. Patents (57) ABSTRACT An electromagnetic automatic balancing device based on radial excitation includes a shell, a rotatory ring, a stationary ring, a pair of connecting bearings and a controller. The rotatory ring includes two bilaterally symmetrical outer excitation magnetic rings, two bilaterally symmetrical inner excitation magnetic rings, two bilaterally symmetrical counterweight discs, two bilaterally symmetrical first counterweight blocks, two bilaterally symmetrical second counterweight blocks and a pair of rotatory-ring bearings. The stationary ring includes a stator, two bilaterally symmetrical excitation frameworks and two bilaterally symmetrical coils. The rotatory ring and the stationary ring are installed in the shell and connected through a pair of connecting bearings. The stator is installed in the center of the shell. The excitation frameworks are respectively fixed at both ends of the stator.

9 Claims, 6 Drawing Sheets (58) Field of Classification Search
USPC .............................. 310/75 R, 154.01, 156.01
See application file for complete search history.

(56) References Cited

U.S. PATENT DOCUMENTS

| | | | |
|---|---|---|---|
| 10,277,101 B2* | 4/2019 | Takahashi | H02K 21/042 |
| 2009/0200882 A1* | 8/2009 | Berdut-Teruel | H02K 16/00 |
| | | | 310/90 |
| 2013/0162068 A1* | 6/2013 | Crosby | H02K 1/17 |
| | | | 310/154.11 |
| 2016/0006304 A1* | 1/2016 | Tojima | H02K 1/17 |
| | | | 310/154.02 |

FOREIGN PATENT DOCUMENTS

| | | |
|---|---|---|
| CN | 106312821 A | 1/2017 |
| CN | 206743029 U | 12/2017 |
| CN | 110829711 A | 2/2020 |
| JP | 2002148134 A | 5/2002 |

\* cited by examiner

ELECTROMAGNETIC AUTOMATIC BALANCING DEVICE BASED ON RADIAL EXCITATION

CROSS-REFERENCE TO RELATED APPLICATION

This application is a continuation of PCT/CN2020/123514, filed on Oct. 26, 2020 and entitled "An electromagnetic automatic balancing device based on radial excitation", which claims the priority benefits of Chinese Patent Application No. 201911050276.X filed on Oct. 30, 2019 and entitled "An electromagnetic automatic balancing device based on radial excitation", the contents of the above identified applications are hereby incorporated by reference in its entirety.

FIELD IN THE INVENTION

The invention relates to an automatic balancing device, in particular to an electromagnetic automatic balancing device based on radial excitation.

BACKGROUND TECHNOLOGY

Excessive vibration caused by rotor mass unbalance is the most common fault of rotating machinery, which seriously affects the operation efficiency, working accuracy and service life of the equipment et al. The automatic balancing device, which can automatically suppress the unbalance fault of rotating equipment online, has been considered as the effective scheme to solve the unbalanced vibration fault because of its fast balancing speed and no need to shut down the equipment in the balancing process.

The electromagnetic-ring automatic balancing device is an active balancing actuator which uses electromagnetic force to drive the counterweight blocks to rotate. It was first proposed by Dyer S. W. et al from U.S. Blance Dynamics company (baladyne) in 1998. This kind of automatic balancing devices not only has the advantages of no complex auxiliary system, simple operation and fast balancing speed, but also reduces the processing accuracy requirements of internal parts and makes it less difficult to manufacture. In the working process, there is no need for electric energy and control signal to be transmitted between the moving and static parts, which fundamentally avoids the use of worn parts such as electric brush et al and has longer service life of the equipment. However, in the traditional balancing devices, the rotatory-ring and the stationary—ring adopt two-posture structure and the rotatory-ring and the stationary-ring need to be installed respectively in the installation process, and the gap between the rotatory-ring and the stationary-ring should be about 0.5 mm, so it is difficult to install and use. Although there is no need to adjust the gap between the rotatory-ring and stationary-ring during the installation of the integrated electromagnetic-ring automatic balancing structure, which greatly reduces the installation difficulty of this kind of products, due to its axial excitation structure, when the counterweight discs are under excessive force, the counterweight discs may yaw and rub with the excitation magnetic rings, which will interfere with the balancing process.

The key in the invention is to improve the axial excitation structure to the radial excitation structure on the basis of the integrated electromagnetic-ring automatic balancing structure, so as to solve the problems of yaw and rubbing with the excitation magnetic rings during the rotation of the counterweight discs, and adopt the combined drive of permanent magnets and soft irons, which effectively increases the driving capacity and increases stability and reliability of the operation of the balancing device on the premise that the self-locking force meets the demand.

SUMMARY IN THE INVENTION

The purpose of the application is to solve the present problems existing in the axial excitation structure, and to provide an electromagnetic automatic balancing device based on radial excitation. A radial drive structure is used inside of the device, and the counterweight discs are jointly driven by permanent magnets and soft irons.

In order to solve the above technical problem, the invention adopts the following technical scheme:

An electromagnetic automatic balancing device based on radial excitation in the invention, which comprises a shell, a rotatory-ring, a stationary-ring, a pair of connecting bearings and a controller, the rotatory-ring comprises two bilaterally symmetrical outer excitation magnetic rings, two bilaterally symmetrical inner exciting magnetic rings, two bilaterally symmetrical counterweight discs, two bilaterally symmetrical first counterweight blocks, two bilaterally symmetrical second counterweight blocks and a pair of rotatory-ring bearings; and the stationary-ring comprises a stator and two bilaterally symmetrical excitation frameworks and two bilaterally symmetrical coils; both the rotatory-ring and the stationary-ring are installed in the shell and connected through a pair of connecting bearings; the shell is divided into two spaces by a partition, and a stator is installed in the center of the shell along the axial direction of the shell, and the excitation frameworks are respectively fixed at both ends of the stators of the above two spaces, coils are installed in every excitation frameworks, the controller is respectively connected with each coil through wires, and a rotatory-ring is respectively installed in the space enclosed by the coils, the shell, the partition and the stator, therein: the outer walls of the outer excitation magnetic rings are fixed on the inner wall of the shell, even number (2N) inner teeth of the outer excitation magnetic rings are evenly distributed on the circumference of the outer excitation magnetic rings, the inner excitation magnetic rings are fixed on the middle partition of the shell, the inner excitation magnetic rings and the outer excitation magnetic rings rotate coaxially, and the inner diameters of the inner excitation magnetic rings are connected with the stator through a pair of connecting bearings and keep the gap harmonized, and even number (2N) outer teeth of inner excitation magnetic rings are evenly distributed on the circumstances of the inner excitation magnetic rings, the number of inner teeth of the outer excitation magnetic rings is equal to the number of outer teeth of the inner excitation magnetic rings, at the axial direction of the shell, the inner teeth of the outer excitation magnetic rings correspond to the outer teeth of the inner excitation magnetic rings, and two rotatory-ring bearings are installed on the other end of the inner excitation magnetic rings, the counterweight discs are fixed on the outer rings of rotatory-ring bearings, two first counterweight blocks and two second counterweight blocks are respectively installed on both sides of the counterweight discs, and a convex ring is positioned on the outer circumference of the counterweight discs, and the convex ring extends between the inner teeth of the outer excitation magnetic rings and the outer teeth of the inner excitation magnetic rings, several holes are positioned on the convex ring, which are divided into a hole group with permanent magnets and a hole group with soft irons, the hole group with permanent magnets and the hole group with soft irons are arranged alternately along the circumference of the convex ring.

An electromagnetic automatic balancing device based on radial excitation in the invention, therein: there are even number of holes in the hole group with permanent magnets, and the spacing between each hole is equal, permanent magnets are installed in every hole, in which the N pole of the permanent magnet in one hole faces the outer teeth of the inner excitation magnetic rings, the S pole faces the inner teeth of the outer excitation magnetic rings, the S pole of the permanent magnet in the adjacent hole faces the outer teeth of the inner excitation magnetic rings, and the N pole faces the inner teeth of the outer excitation magnetic rings, there are even number of holes in the hole group with soft irons, and the spacing between each hole is equal and equal to the hole spacing in the hole group with permanent magnets, the spacing between the hole group with permanent magnets and the hole group with soft irons is 1.5 times of the hole spacing in the hole group with permanent magnets or the hole spacing in the hole group with soft irons.

The electromagnetic automatic balancing device based on radial excitation in the invention, therein: the rotatory-ring also comprises a rotatory-ring end cover, locating sleeves of outer rings of rotatory-ring bearings and locating sleeves of inner rings of rotatory-ring bearings, the rotatory-ring end cover is fixed on the inner circumferences of the outer excitation magnetic rings on one side of the counterweight discs, the locating sleeves of outer rings of rotatory-ring bearings and the locating sleeves of inner rings of rotatory-ring bearings are installed in the space enclosed by the excitation frameworks and the rotatory-ring end cover and the inner excitation magnetic rings and the rotatory-ring bearings, the locating sleeves of outer rings of rotatory-ring bearings are sheathed on the counterweight discs, one ends of the locating sleeves of outer rings of rotatory-ring bearings are against the outer rings of rotatory-ring bearings, and the locating sleeves of inner rings of rotatory-ring bearings are sheathed on the inner excitation magnetic rings, one ends of the locating sleeves of inner rings of rotatory-ring bearings are against the inner rings of rotatory-ring bearings.

The electromagnetic automatic balancing device based on radial excitation in the invention, therein: the electromagnetic automatic balancing device based on radial excitation also includes bearing fastener and end covers of excitation frameworks, a pair of connecting bearings are installed between outer circumference of stator and inner excitation magnetic rings, and the connecting bearings are sheathed on stator, one ends of the connecting bearings are against the stator and the inner excitation magnetic rings, the other ends of the connecting bearings are installed with a bearing fastener, and the end covers of excitation frameworks are fixed on the excitation frameworks between the excitation frameworks and the rotatory-ring end cover.

The electromagnetic automatic balancing device based on radial excitation in the invention, therein: the first counterweight blocks and the second counterweight blocks are semicircular disc-shaped parts, which are respectively installed on both sides of each counterweight disc.

The electromagnetic automatic balancing device based on radial excitation in the invention, therein: which is characterized in that: a reference magnet is installed on the outer shell covering outside of the excitation frameworks, a reference Hall element is installed at the corresponding position of the excitation frameworks, and the reference Hall element senses the position of the reference magnet and connects with the controller by a wire.

The electromagnetic automatic balancing device based on radial excitation in the invention, therein: which is characterized in that: a positioning magnet is installed on each first counterweight block closed to the coils, a positioning Hall element is installed at the corresponding position of the end covers of excitation frameworks, and the positioning Hall element senses the position of the positioning magnet and connects with the controller.

The electromagnetic automatic balancing device based on radial excitation in the invention, therein: the partition and the shell are integrated.

The electromagnetic automatic balancing device based on radial excitation in the invention, therein: the stator, excitation frameworks, outer excitation magnetic rings, inner excitation magnetic rings and positioning sleeves of outer rings of rotatory-ring bearings are made of soft magnet; the shell and counterweight discs are made of magnetic isolating material; the first counterweight blocks and the second counterweight blocks are made of tungsten copper alloy, brass, stainless steel or aluminum alloy.

The electromagnetic automatic balancing device based on radial excitation in the invention, therein: the electromagnetic automatic balancing device based on radial excitation is fixed on the shaft end of the rotating device by a connecting flange.

An electromagnetic automatic balancing device based on radial excitation is installed at the end of the rotating shaft of the rotating device in the invention. In the working process, the controller inputs alternating positive and negative driving voltage to the coils, the stationary-ring generates alternating magnetic field on the side of the rotatory-ring according to the driving voltage, and the inner and outer excitation magnetic rings inside the rotatory-ring magnetize rapidly under the magnetic field, the interaction force between the inner and outer excitation magnetic rings and the permanent magnets and the soft irons on the counterweight discs drives the counterweight discs inside the rotatory-ring to step-by-step rotate relative to the rotating device under electromagnetic force.

Because the two counterweight discs are equipped with eccentric mass blocks with the same balancing capacity, the phase of the center lines of the two eccentric mass blocks and the angle between the counterweight blocks are adjusted through the step-by-step rotation of the two counterweight discs, and the mass distribution inside the balancing device can be changed online to form a compensation vector with moderate size and direction, and the unbalanced vibration of the rotating device can be suppressed online. Compared with the traditional axial excitation structure, the radial excitation structure in the invention solves the problem of yaw and rubbing between the inner excitation magnetic rings and the outer excitation magnetic rings of the counterweight discs, the coordination gap between the counterweight discs and the inner excitation magnetic rings and the outer excitation magnetic rings can be smaller, and soft irons are used to replace part of the permanent magnets, which has competitive advantages in balance ability, balance speed and stability.

In FIGS. 1 to 6, mark 1 is the shell; mark 2 is the outer excitation magnetic rings; mark 3 is the inner excitation magnetic rings; mark 4 is the counterweight discs; mark 5 is the first counterweight blocks; mark 6 is the end cover of the rotatory-ring; mark 7 is the end covers of the excitation frameworks; mark 8 is the excitation frameworks; mark 9 is the rotatory-ring bearings; mark 10 is the stator; mark 11 is the bearing fastener; mark 12 is the lock nut; mark 13 is the controller; mark 14 is the rotating device; mark 15 is the connecting flange; mark 16 is the reference magnet; mark 17 is the reference Hall element; mark 18 is the positioning Hall element; mark 19 is the positioning magnet; mark 20 is the permanent magnets; mark 21 is the soft irons; mark 22 is the partition; mark 23 is the outer teeth of the inner excitation magnetic rings; mark 24 is the inner teeth of the outer excitation magnetic rings; mark 25 is the second counterweight blocks; mark 26 is the coils; mark 27 is the connecting bearings; mark 28 is the convex ring; mark 29 is the locating sleeves of outer rings of rotatory-ring bearings; mark 30 is the locating sleeves of inner rings of rotatory-ring bearings.

EXEMPLARY EMBODIMENT

Figure 1:
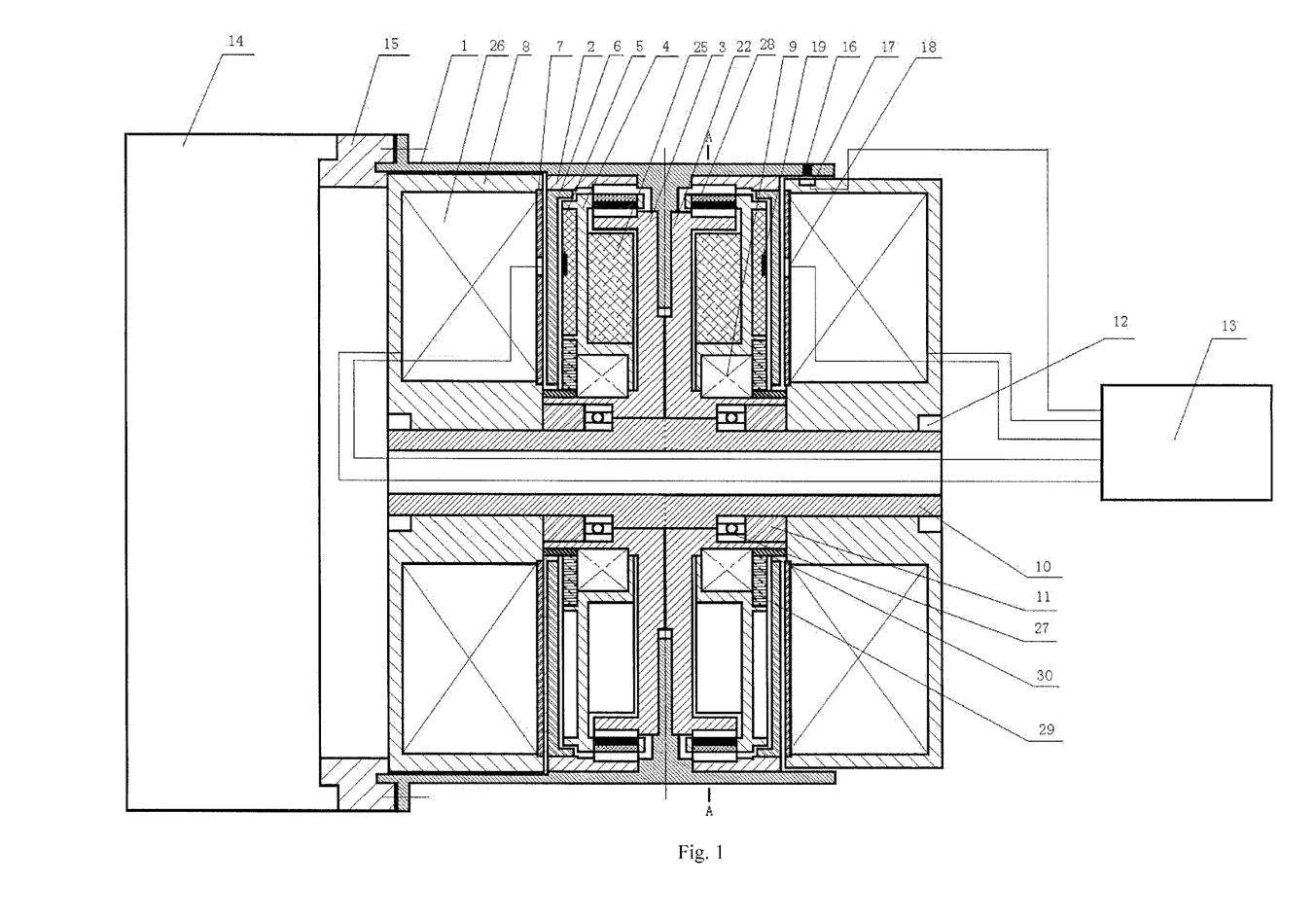
FIG. 1 is a sectional diagram of the radial excitation electromagnetic-ring automatic balancing device in the invention.

As shown in FIG. 1, an electromagnetic automatic balancing device based on radial excitation of the present invention is fixed on the shaft end of the rotating device 14 through a connecting flange 15, which comprises a rotatory-ring, a stationary-ring, a controller 13 and a pair of connecting bearings 27. The rotatory-ring and the stationary-ring are installed in the shell 1.

The rotatory-ring includes: shell 1, outer excitation magnetic rings 2, inner excitation magnetic rings 3, counterweight discs 4, first counterweight blocks 5, second counterweight blocks 25, rotatory-ring bearings 9, rotatory-ring end cover 6, locating sleeve of a bearing outer ring 29 and locating sleeve of bearing inner ring 30; the stationary-ring includes: stator 10, excitation frameworks 2, end covers of excitation frameworks 7 and coils 26. The rotatory-ring and the stationary-ring are installed in the shell 1.

The shell 1 is divided into two spaces by the partition 22. The shell 1 and the partition 22 are integrated. Two inner excitation magnetic rings 3 are respectively fixed on the partition 22 of the shell 1 by bolts. Several outer teeth 23 of the inner excitation magnetic rings are evenly distributed on the circumference of the inner excitation magnetic rings 3. The first counterweight blocks 5 and the second counterweight blocks 25 are semicircular disc-shaped parts, which are respectively installed on the inner and outer sides of the counterweight discs 4. The rotatory-ring end cover 6 is fixed on the inner circumferences of the outer excitation magnetic rings 2 on one side of the counterweight discs 4, which plays the role of separating the rotatory-ring from the stationary-ring and dust proof. The rotatory-ring bearings 9 are installed in the bearing hole of the counterweight discs 4. The counterweight discs 4, the first counterweight blocks 5, the second counterweight blocks 25 and the rotatory-ring bearings 9 are integrally sheathed on the outer rings of inner excitation magnetic rings 3, and are positioned by the stepped shaft on the rotatory-ring bearings 9 and the inner excitation magnetic rings 3, and the stepped shaft is the stator 10. The locating sleeve of a bearing outer ring 29 and the locating sleeve of bearing inner ring 30 are fixed on the outer sides of the rotatory-ring bearings 9. The locating sleeves 29 of the outer rings of rotatory-ring bearings are sheathed on the counterweight discs 4, and one end of the locating sleeve 29 is against the outer rings of rotatory-ring bearings 9, and it is used for locating the outer rings of rotatory-ring bearings 9, preventing the relative movement of the outer rings of rotatory-ring bearings 9 and the counterweight discs 4. In addition, it plays a sealing role of rotatory-ring bearings 9. The locating sleeves 30 of the inner rings of the rotatory-ring bearings are sheathed on the inner excitation magnetic rings 3. One end of the locating sleeve is against the inner rings of the rotatory-ring bearings 9 and is used for locating the inner rings of a rotatory-ring bearings 9 to prevent the relative movement of the inner rings of rotatory-ring bearings 9 and the inner excitation magnetic rings 3.

The outer walls of the outer excitation magnetic rings 2 are fixed on the inner wall of the shell 1, and several inner teeth 24 of the outer excitation magnetic rings are evenly distributed on the circumference of the outer excitation magnetic rings 2. The numbers of inner teeth 24 of outer excitation magnetic rings and outer teeth 23 of the inner excitation magnetic rings are equal, and the number of teeth is 24 respectively. The teeth shape is rectangular. The inner teeth 24 of the outer excitation magnetic rings correspond with the outer teeth 23 of the inner excitation magnetic rings one by one along the radial direction of the shell 1. The outer ring of the stator 10 and the inner diameters of the inner excitation magnetic rings 3 are installed coordinately through gap. The inner rings of the connecting bearings 27 are coordinated with the outer surface of the stator 10, the outer ring of which is coordinated with the bearing holes of the inner excitation magnetic rings 3, and the outer sides of the connecting bearings 27 are installed with the bearing fastener 11.

Along the axial direction of the shell 1, a stator 10 is installed in the center of the shell 1, excitation frameworks 8 are fixed at both ends of the stator 10, and annular coils 26 are installed inside each excitation framework 8. The end covers of excitation frameworks 7 are fixed in the grooves of the end faces of the excitation frameworks 8. The excitation frameworks 8, the coils 26 and the end covers of excitation frameworks 7 are integrally installed on the stator 10, and the outer side is fixed on the stator 10 through the lock nut 12.

Figure 2:
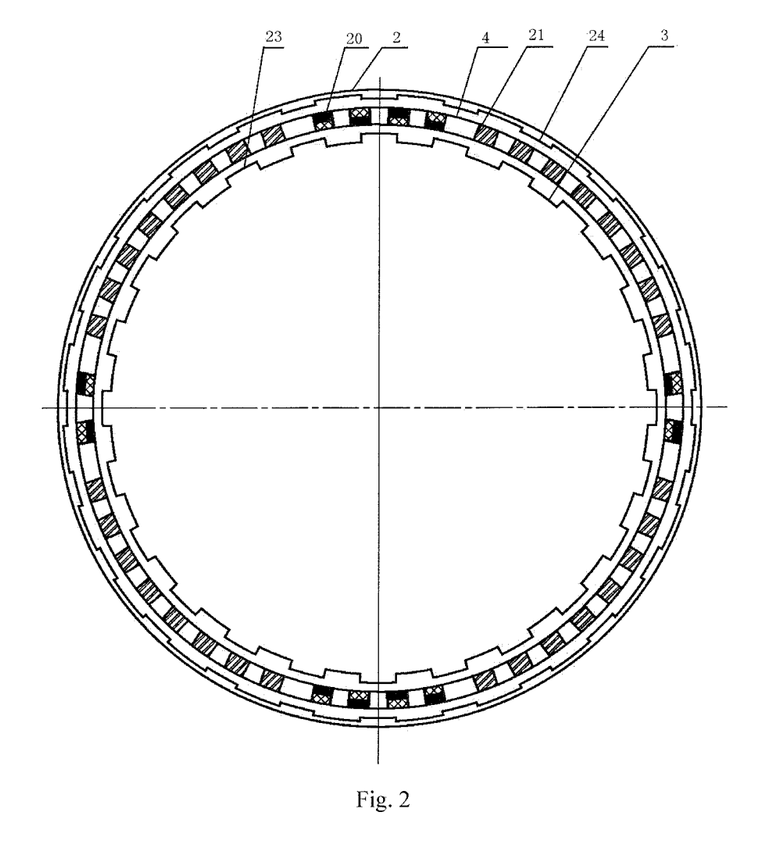
FIG. 2 is the schematic diagram of the coordination relationship of the outer excitation magnetic rings, the inner excitation magnetic rings and the counterweight discs in FIG. 1A-A.
Figure 3:
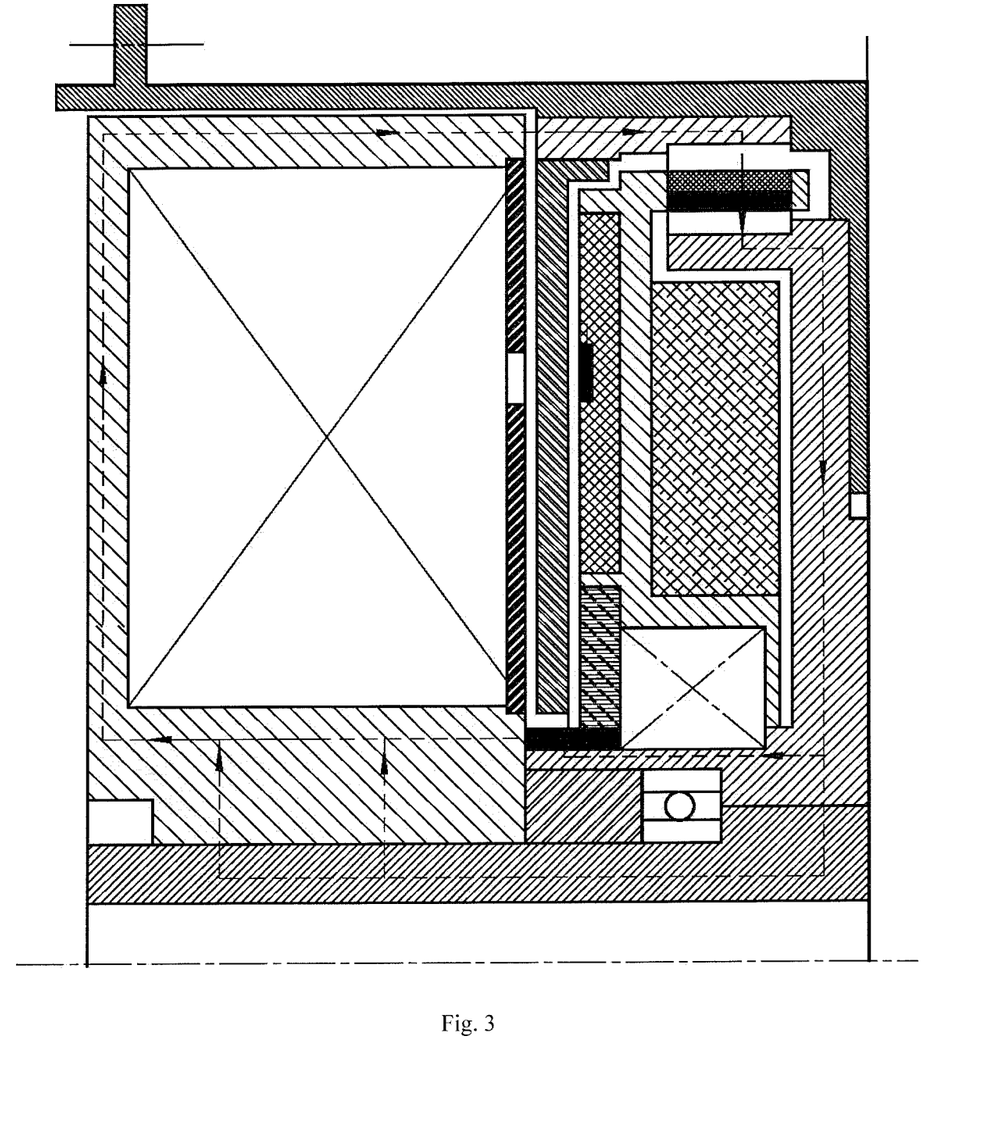
FIG. 3 is an enlarged local magnetic circuit analysis diagram of the radial excitation electromagnetic-ring automatic balancing device in the invention.

As shown in FIG. 2, there is a convex ring 28 on the outer circumferences of the counterweight discs 4, which extends between the inner teeth 24 of the outer excitation magnetic rings and the outer teeth 23 of the inner excitation magnetic rings. There are several holes on the convex ring, which are divided into the hole group with permanent magnets and the hole group with soft irons. The hole group with permanent magnets and the hole group with soft irons are arranged alternately along the circumference of the convex ring. There are 2, 4, 6 or 10 holes in the hole group with permanent magnets, and the spacing between each hole is equal, and a permanent magnet is installed in each hole. The N pole of the permanent magnet in one hole faces the outer teeth of the inner excitation magnetic rings, the S pole faces the inner teeth of the outer excitation magnetic rings, and the S pole of the permanent magnet in the adjacent hole faces the outer teeth of the inner excitation magnetic rings, and the N pole face the inner teeth of the outer excitation magnetic rings. There are—holes in the hole group with soft irons, the spacing between each hole with a soft iron is equal to that in the hole group with permanent magnets. The spacing between the hole group with the permanent magnets and the hole group with soft irons is 1.5 times of the hole spacing in the hole group with permanent magnets or the hole group with soft irons. The first counterweight blocks and the second counterweight blocks are respectively installed on both sides of the counterweight discs. For example, the numbers of inner teeth 24 of the outer excitation magnetic rings and outer teeth 23 of the inner excitation magnetic rings are 24 respectively, the teeth profile of which is rectangular, the teeth width of which is the hole spacing of the adjacent two permanent magnets 20 or the hole spacing of the adjacent two soft irons 21, there are four hole groups with permanent magnets 20 and four hole groups with soft irons 21 on the convex ring 28 of the outer circumference of the counterweight discs 4. The permanent magnets 20 and the soft irons 21 are pressed into above holes by interference fit. The hole group with permanent magnets 20 and the hole group with soft irons 21 are symmetrically arranged on the outer circumference of convex ring 28 respectively, and the gaps among permanent magnets 20 and soft irons 21 and the top of inner teeth 24 of outer excitation magnetic rings and the top of outer teeth 23 of inner excitation magnetic rings are generally in the range of 0.3 mm~0.5 mm.

The stationary-ring includes: stator 10, excitation frameworks 8, end covers of excitation frameworks 7 and coils 26. The stator 10 is a stepped shaft with a through hole in the middle and threads on both ends. The outer ring of stator 10 and the inner diameters of inner excitation magnetic rings 3 are coordinately installed through gap, and the gap is in the range of 0.2-0.4 mm. The excitation frameworks 8 are in the shape of a "mountain" and the annular coils 26 are installed inside. The bottom of the excitation frameworks 8 is positioned with a through hole for leading out the positioning Hall sensing element 18 and the coil 26 wires. The end covers of excitation frameworks 7 are fixed in the grooves of the end faces of the excitation frameworks 8 for fixing the coils. The excitation frameworks 8, the coils 26 and the end covers of excitation frameworks 7 are together sheathed into the stator 10, one ends of the excitation frameworks 8 are against the bearing fastener 11, and the outer sides of the excitation frameworks 8 are fixed on the stator 10 through the lock nut 12. The inner coil 26 wire of the excitation frameworks 8 is led out from the bottom through hole of the inner excitation frameworks 8 and is passed through the through hole of the stator 10, and is led into the aviation plug together with the outer coil 26 wire and is accessed to the controller 13. The controller 13 is installed on the outer side of the balancing device.

The inner rings of the connecting bearings 27 are coordinated with the external surface of the stator 10, and the outer rings of the connecting bearings 27 are coordinated with the bearing holes of the inner excitation magnetic rings 3, which is used to connect the rotatory-ring and stationary-ring and ensure them a long-term stable operation under small gap. The bearing fastener 11 is installed on the outer sides of the connecting bearings 27, and it can control the gap between the excitation frameworks 8 and the rotatory-ring through its axial length and fix the inner rings of the connecting bearings 27.

The shell 1 of the outer excitation frameworks 8 are positioned with a reference magnet 16, the corresponding position of the outer excitation frameworks 8 are positioned with a reference Hall element 17, and the reference Hall element 17 senses the position of the reference magnet 16. The positioning magnet 19 is arranged on each first counterweight blocks 5 closed to the coils 26, the corresponding position of the end covers 7 of the excitation frameworks are positioned with a groove, and the positioning Hall element 18 is embedded in the groove of end covers 7 of the excitation frameworks and senses the position of the positioning magnet 19. The outer positioning Hall element 18 wire is passed through the bottom through holes of the outer excitation frameworks 8. The inner positioning Hall element 18 is led out from the bottom through holes of the inner excitation frameworks 8 and are passed through the through hole of the stator 10, and is led into the aviation plug together with the outer positioning Hall element 18 wire. Two buses in total are led out from the aviation plug, which are used to distinguish the strong current from the weak current. The coils 26 wire is led into the strong current bus, the wires of reference Hall element 17 and the positioning Hall element 18 are led into the weak current bus, and the strong and weak current buses are both connected with the controller 13. The reference Hall element 17 and the positioning Hall element 18 can detect the specific phases of the two counterweight discs 4.

The stator 10, excitation frameworks 8, outer excitation magnetic rings 2, inner excitation magnetic rings 3 and locating sleeves 29 of outer rings of rotatory-ring bearings are made of soft magnetic materials; the shell 1 and counterweight discs 4 are made of magnetic isolating materials such as aluminum alloy et al, the first counterweight blocks 5 and the second counterweight blocks 25 are made of tungsten copper alloy, brass, stainless steel or aluminum alloy.

In the working process, the stationary-ring does not rotate with the rotatory-ring. When the balancing device is needed to act, the stationary-ring generates an alternating magnetic field on the side of the rotatory-ring under the action of the control signal, which drives the inner core part of the rotatory-ring counterweight discs 4 and the outer rings of rotatory-ring bearings 9 connected with it to step-by-step rotate relative to the outer excitation magnetic rings 2 and the inner excitation magnetic rings 3 of the rotatory-ring, driving the first counterweight blocks 5 and the second counterweight blocks 25 to form the required compensation mass, so as to suppress the unbalanced vibration of the spindle of rotation device 14 online.

Figure 4:
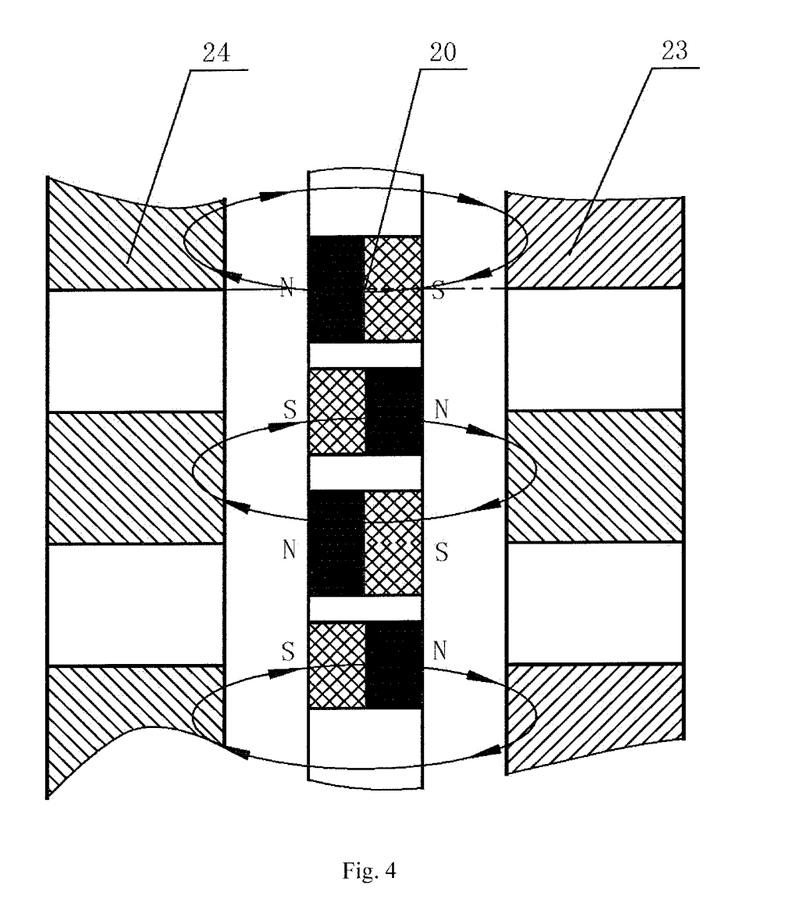
FIG. 4 is the enlarged magnetic circuit analysis diagram of the outer excitation magnetic rings, the inner excitation magnetic rings and the counterweight discs of the radial excitation electromagnetic-ring automatic balancing device in the invention at self-locking state.
Figure 5:
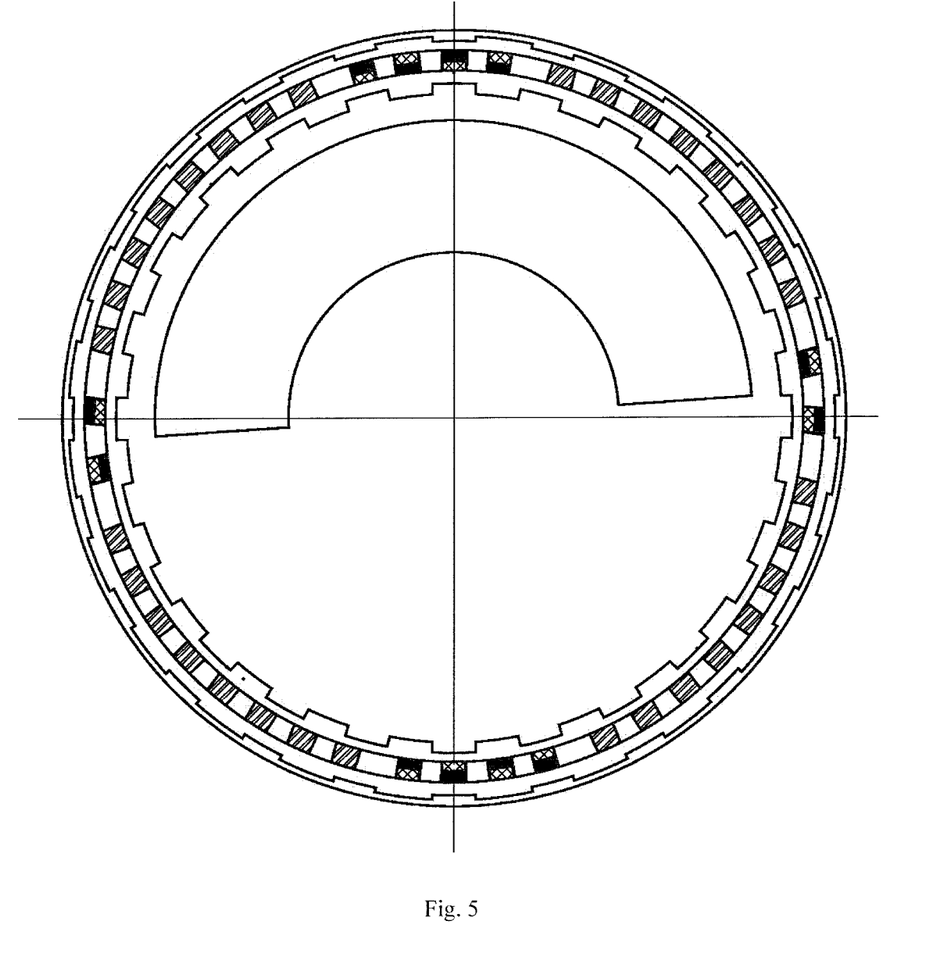
FIG. 5 is a schematic diagram of the coordination relationship of the outer excitation magnetic rings, the inner excitation magnetic rings and the counterweight discs of the radial excitation electromagnetic-ring automatic balancing device in the invention at the middle position of the step-by-step state.
Figure 6:
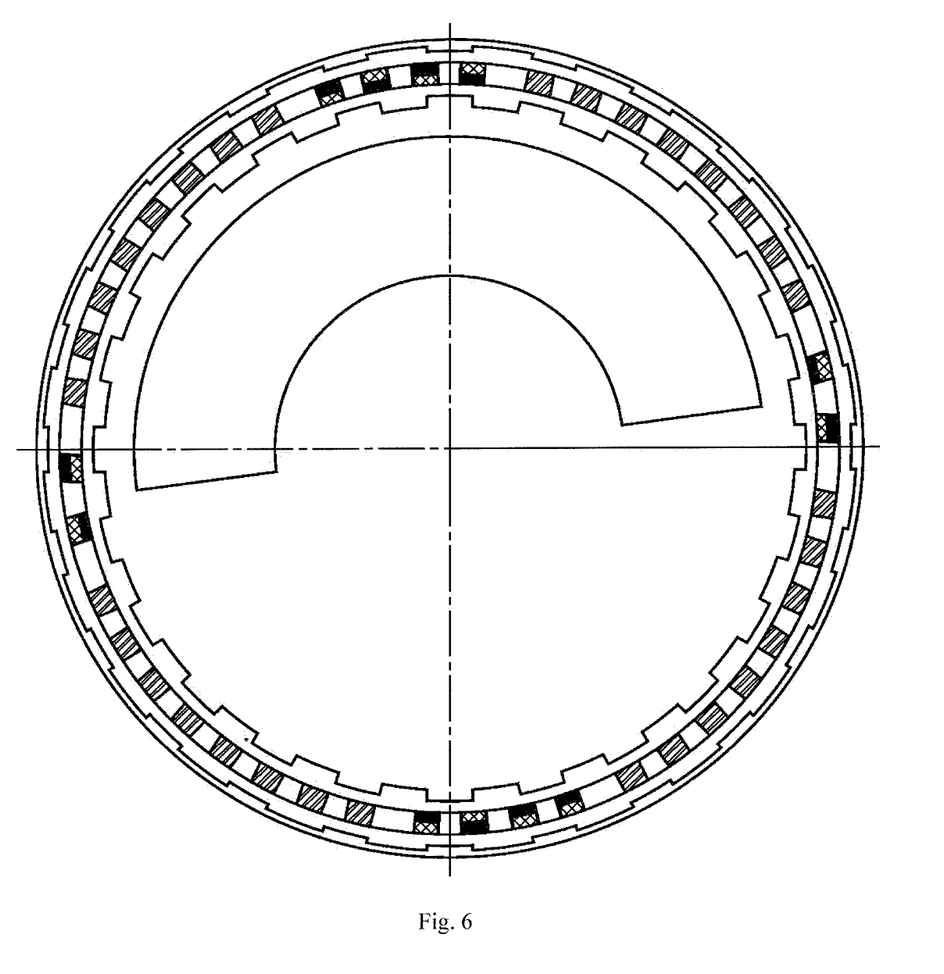
FIG. 6 is a schematic diagram of the coordination relationship of the outer excitation magnetic rings, the inner excitation magnetic rings and the counterweight discs of the radial excitation electromagnetic-ring automatic balancing device in the invention at the final position of the step-by-step state.

The radial excitation electromagnetic-ring automatic balancing device in the invention is an axisymmetric structure, as shown in FIG. 4, taking its quarter structure for magnetic circuit analysis, and the transmission principle of the magnetic circuit is illustrated as follows: the excitation frameworks 8 of the stationary-ring, the stator 10 of the stationary-ring, the outer excitation magnetic rings 2 and the inner excitation magnetic rings 3 of the rotatory-ring and the positioning sleeves 29 of outer rings of rotatory-ring bearings are all made of soft magnetic materials, which form a closed magnetic circuit. The closing direction of the magnetic circuit is determined by the positive or negative driving voltage supplied by the controller 13 to the coils 26. In the working process, the coils 26 are electrified to generate a magnetic field. After the magnetic field is strengthened by the excitation frameworks 8, it passes through the gap between the rotatory-rings and stationary-rings vertically along the direction of the arrow in the figure, and the outer exciting magnetic ring 2 and the inner exciting magnetic ring 3 are magnetized to form the N pole and the S pole respectively. According to the principle of "same magnetic poles repel each other and opposites attract each other" of the magnets, the outer exciting magnetic ring 2 and the inner exciting magnetic ring 3 interact with the counterweight discs 4 and drive it to step-by-step rotate relative to the other parts of rotatory-ring. The magnetic circuit returns to the excitation frameworks 8 through the inner excitation magnetic rings 3, the locating sleeves 29 of outer rings of rotatory-ring bearings and the stator 10, forming a closed magnetic circuit.

The outer excitation magnetic rings 2 and the inner excitation magnetic rings 3 are made of soft magnetic materials. When the magnetic field is generated by the stationary-ring, the outer excitation magnetic rings 2 and the inner excitation magnetic rings 3 is magnetized rapidly to drive the counterweight discs 4 to step-by-step act. When the magnetic field of the stationary-ring is cancelled, the magnetic field of the outer excitation magnetic rings 2 disappears rapidly and the counterweight discs 4 continues to move to the next self-locking state under the action of inertia. The inner ring of outer excitation magnetic rings 2 and the outer ring of inner excitation magnetic rings 3 are respectively processed with 24 radial convex inner teeth 24 of outer excitation magnetic rings and outer teeth 23 of inner excitation magnetic rings. Their teeth profile is rectangular, the teeth width is the spacing between adjacent permanent magnets 20 or adjacent soft irons 21, and the teeth thickness is slightly larger than the length of permanent magnet/soft iron blocks. During the assembly process, the top of inner teeth 24 of outer excitation magnetic rings and the top of outer teeth 23 of inner excitation magnetic rings are required to be in one-to-one correspondence.

The material of the counterweight discs 4 is aluminum alloy. There is a convex ring 28 on the outer circumference of the counterweight discs 4. 44 long cylindrical holes are processed along the radial direction of the convex ring 28, which are respectively used to install the cylindrical soft irons 21 and the permanent magnets 20. The polarity of the adjacent permanent magnets 20 is opposite, which is used for the self-locking of the counterweight discs 4 and the drive of external magnetic field. The inner ring of the counterweight discs 4 is connected with the outer rings of rotatory-ring bearings 9, on both sides of which a semicircular eccentric first counterweight blocks 5 and a second counterweight blocks 25 are respectively installed. The counterweight discs 4 is located in the middle of the outer excitation magnetic rings 2 and the inner excitation magnetic rings 3, and the gap between the counterweight discs 4 and the top of the inner teeth 24 of the outer excitation magnetic rings or the top of the outer teeth 23 of the inner excitation magnetic rings is generally 0.3 mm~0.5 mm. The cylindrical permanent magnets 20 and the soft irons 21 are pressed into the long cylindrical hole of the counterweight discs 4 through the interference connection. Each two adjacent permanent magnets 20 are a pair, corresponding to a teeth top of the outer excitation magnetic rings 2 and the inner excitation magnetic rings 3, and the adjacent soft iron 21 corresponds to a teeth top and a teeth bottom of the outer excitation magnetic rings 2 and the inner excitation magnetic rings 3 respectively.

As shown in FIG. 4, under the self-locking state and the absence of external magnetic field, by the magnetic field formed by permanent magnets 20, outer excitation magnetic rings 2 and inner excitation magnetic rings 3, the mutual attractive self-locking force is formed among the permanent magnets 20, outer magnetic ring 2 and inner magnetic ring 3 to ensure that the counterweight discs 4 can rotate synchronously with the rotating device 14 when the rotating device 14 rotates at a constant speed, acceleration or deceleration and will not rotate relative to the rotating device 14. The magnetic circuit path of the permanent magnets 20 is as follows: from the N pole of a permanent magnet 20, through the outer teeth 23 of the inner excitation magnetic rings, back to the S pole of the adjacent permanent magnet 20, then through the permanent magnet 20, to the inner teeth 24 of the outer excitation magnetic rings on the other side, and finally back to the S pole of the first permanent magnet 20, forming a closed ring. Referring to the principle of magnetic drive technology, since the magnetic resistance of permanent magnetic field circuit is the minimum at this position, the microvibration of counterweight discs 4 in any direction will generate a magnetic force on counterweight discs 4 to make it return to a stable balanced position, so as to prevent counterweight discs 4 from sliding. The permanent magnets 20 generate locking force with the outer excitation magnetic rings 2 and the inner excitation magnetic rings 3, namely the self-locking force, by passing through the magnetic force line of the excitation magnetic rings. Under the action of the self-locking force, the counterweight discs 4 rotates with the rotating device 14 and will not rotate relative to the rotating device 14 at a certain acceleration or deceleration, realizing the self-locking function of the counterweight discs 4.

Under the action of the external magnetic field, the outer excitation magnetic rings 2 and the inner magnetic ring 3 are magnetized to produce the corresponding S-pole and N-pole, between which and the magnetic pole of the permanent magnets 20 the effect of "same magnetic poles repel each other and opposites attract each other" happens. The attraction and repellent of each group of magnetic poles produce the same direction magnet torque relative to the center of the rotating shaft to make the counterweight discs 4 moves counterclockwise. After the counterweight discs 4 rotates, the original balance of force among the soft irons 21 and the outer excitation magnetic rings 2 and the inner excitation magnetic rings 3 is broken. The soft irons 21 are attracted with the magnetized outer excitation magnetic rings 2 and the inner excitation magnetic rings 3 and move to the direction of the minimum magnetic resistance. The soft irons 21 and the permanent magnets 20 jointly drive the counterweight blocks 4 to continue to rotate in counterclockwise, and move from the position shown in FIG. 2 to the middle position shown in FIG. 5. The driving voltage needs to be cut off in time now and the counterweight discs 4 moves to the final position shown in FIG. 6 under the action of its own inertia force and self-locking force to complete the one-step rotation operation. If the direction of the external magnetic field continues to be changed alternately, counterweight discs 4 will produce continuous movement in a counterclockwise direction.

The above-mentioned embodiments only describe the preferred embodiment in the invention, not limit to the scope in the invention. On the premise of not departing from the design spirit in the invention, all kinds of deformation and improvement made by ordinary technicians in the art on the technical scheme in the invention shall be in the protection scope determined by the claims in the invention.

We claim:

1. An electromagnetic automatic balancing device based on radial excitation, which comprises a shell (1), a rotatory-ring, a stationary-ring, a pair of connecting bearings (27) and a controller (13), wherein:

the rotatory-ring comprises two bilaterally symmetrical outer excitation magnetic rings (2), two bilaterally symmetrical inner exciting magnetic rings (3), two bilaterally symmetrical counterweight discs (4), two bilaterally symmetrical first counterweight blocks (5), two bilaterally symmetrical second counterweight blocks (25) and a pair of rotatory-ring bearings (9); and the stationary-ring comprises a stator (10) and two bilaterally symmetrical excitation frameworks (8) and two bilaterally symmetrical coils (26); both the rotatory-ring and the stationary-ring are installed in the shell (1) and connected through a pair of connecting bearings (27);

the shell (1) is divided into two spaces by a partition (22), and a stator (10) is installed in a center of the shell (1) along the axial direction of the shell (1), and the excitation frameworks (8) are respectively fixed at both ends of the stators (10) of the two spaces, coils are installed in every excitation framework (8), the controller (13) is respectively connected with each coil (26) through wires, and the rotatory-ring is respectively installed in a space enclosed by the coils (26), the shell (1), the partition (22) and the stator (10), the electromagnetic automatic balancing device is characterized in that: outer walls of the outer excitation magnetic rings (2) are fixed on inner wall of the shell (1), even number (2n) inner teeth (24) of the outer excitation magnetic rings are evenly distributed on circumferences of the outer excitation magnetic rings (2), the inner excitation magnetic rings (3) are fixed on the middle partition (22) of the shell (1), the inner excitation magnetic rings (3) and the outer excitation magnetic rings (2) rotate coaxially, and the inner diameters of the inner excitation magnetic rings (3) are connected with the stator (10) through a pair of connecting bearings (27) and keep the gap harmonized, and even number (2n) outer teeth of inner excitation magnetic rings (23) are evenly distributed on the circumstances of the inner excitation magnetic rings (3), the number of inner teeth (24) of the outer excitation magnetic rings is equal to the number of outer teeth (23) of the inner excitation magnetic rings, at the axial direction of the shell (1), the inner teeth (24) of the outer excitation magnetic rings correspond to the outer teeth (23) of the inner excitation magnetic rings, and rotatory-ring bearings (9) are installed on one ends of the inner excitation magnetic rings (3), counterweight discs (4) are fixed on the outer rings of rotatory-ring bearings (9), first counterweight blocks (5) and second counterweight blocks (25) are respectively installed on both sides of the counterweight discs (4), and a convex ring (28) is on the outer circumferences of the counterweight discs (4), and the convex ring (28) extends between the inner teeth (24) of the outer excitation magnetic rings and the outer teeth (23) of the inner excitation magnetic rings, several holes are positioned on the convex ring (28), which are divided into a hole group with permanent magnets (20) and a hole group with soft irons (21), the hole group with permanent magnets (20) and the hole group with soft irons (21) are arranged alternately along the circumference of the convex ring (28), there are even number of holes in the hole group with permanent magnets (20), and the spacing between each hole is equal, a permanent magnet (20) is installed in every hole, in which the N pole of the permanent magnet (20) in one hole faces the outer teeth (23) of the inner excitation magnetic rings, the S pole faces the inner teeth (24) of the outer excitation magnetic rings, the S pole of the permanent magnet (20) in the adjacent hole faces the outer teeth (23) of the inner excitation magnetic rings, and the N pole faces the inner teeth (24) of the outer excitation magnetic rings, there are even number of holes in the hole group with soft irons (21), and the spacing between each hole is equal and equal to the hole spacing in the hole group with permanent magnets (20), the spacing between the hole group with permanent magnets (20) and the hole group with soft irons (21) is 1.5 times of the hole spacing in the hole group with permanent magnets (20) or the hole spacing in the hole group with soft irons (21).

2. The electromagnetic automatic balancing device based on radial excitation according to claim 1, characterized in that: the rotatory-ring also comprises a rotatory-ring end cover (6), locating sleeves of outer rings (29) of rotatory-ring bearings and locating sleeves of inner rings (30) of rotatory-ring bearings, the rotatory-ring end cover (6) is fixed on the inner circumferences of the outer excitation magnetic rings (2) on one sides of the counterweight discs (4), the locating sleeves of outer rings (29) of rotatory-ring bearings and the locating sleeves of inner rings (30) of rotatory-ring bearings are installed in the space enclosed by the excitation frameworks (8) and the rotatory-ring end cover (6) and the inner excitation magnetic rings (3) and the rotatory-ring bearings (9), the locating sleeves of outer rings (29) of rotatory-ring bearings are sheathed on the counterweight discs (4), one end of the locating sleeves of outer rings (29) of rotatory-ring bearings are against the outer rings of rotatory-ring bearings (9), and the locating sleeves of inner rings (30) of rotatory-ring bearings are sheathed on the inner excitation magnetic rings (3), one end of the locating sleeves of inner rings (30) of rotatory-ring bearings are against the inner rings of rotatory-ring bearings (9).

3. The electromagnetic automatic balancing device based on radial excitation according to claim 2, characterized in that: the electromagnetic automatic balancing device based on radial excitation also includes bearing fastener (11) and excitation framework end covers (7), connecting bearings (27) are installed between the outer circumference of the stator (10) and inner excitation magnetic rings (3), and connecting bearings (27) are sheathed on the stator (10), one ends of the connecting bearings (27) are against the stator (10) and the inner excitation magnetic rings (3), the other ends of the connecting bearings (27) are installed with a bearing fastener (11), and the excitation framework end covers (7) are fixed on the excitation frameworks (8) between the excitation frameworks (8) and the rotatory-ring end cover (6).

4. The electromagnetic automatic balancing device based on radial excitation according to claim 3, characterized in that: the first counterweight blocks (5) and the second counterweight blocks (25) are semicircular disc-shaped parts, which are respectively installed on both sides of each counterweight disc (4).

5. The electromagnetic automatic balancing device based on radial excitation according to claim 4, characterized in that: a reference magnet (16) is installed on the outer shell (1) covering outside of the excitation frameworks (8), a reference Hall element (17) is installed at the corresponding position of the excitation frameworks (8), and the reference Hall element (17) senses the position of the reference magnet (16) and connects with the controller by a wire (13).

6. The electromagnetic automatic balancing device based on radial excitation according to claim 5, characterized in that: a positioning magnet (19) is installed on each first counterweight block (5) closed to the coils (26), a positioning Hall element (18) is installed at the corresponding position of the excitation framework end covers (7), and the positioning Hall element (18) senses the position of the positioning magnet (19) and connects with the controller (13).

7. The electromagnetic automatic balancing device based on radial excitation according to claim 6, characterized in that: the partition (22) and the shell (1) are integrated.

8. The electromagnetic automatic balancing device based on radial excitation according to claim 7, characterized in that: the stator (10), excitation frameworks (8), outer excitation magnetic rings (2), inner excitation magnetic rings (3) and positioning sleeves of outer rings (29) of rotatory-ring bearings are made of the soft magnet; the shell (1) and counterweight discs (4) are made of magnetic isolating material; the first counterweight blocks (5) and the second counterweight blocks (25) are made of tungsten copper alloy, brass, stainless steel or aluminum alloy.

9. The electromagnetic automatic balancing device based on radial excitation according to claim 8, characterized in that: the electromagnetic automatic balancing device based on radial excitation is fixed on the shaft end of the rotating device (14) by a connecting flange (15).

* * * * *